United States Patent [19]

Nelson

[11] Patent Number: 4,653,344

[45] Date of Patent: Mar. 31, 1987

[54] LATERALLY-DISENGAGEABLE BEARING SYSTEM

[75] Inventor: John W. Nelson, Wyoming, Mich.

[73] Assignee: Belco Industries Incorporation, Belding, Mich.

[21] Appl. No.: 694,597

[22] Filed: Jan. 24, 1985

[51] Int. Cl.[4] ...................... F16H 29/00; B65G 25/02; F16C 33/02

[52] U.S. Cl. ......................................... 74/570; 74/116; 74/122; 198/774; 198/776; 384/255; 384/281; 384/295

[58] Field of Search ................. 74/570, 116, 122, 123; 198/774, 776; 384/281, 255, 295, 434, 432

[56] References Cited

U.S. PATENT DOCUMENTS

| | | |
|---|---|---|
| 666,865 | 1/1901 | Holfensteller, Jr. ................. 198/776 |
| 1,278,800 | 9/1918 | Farnum ................................. 384/255 |
| 1,325,553 | 12/1919 | Bacon ................................... 384/255 |
| 1,889,039 | 11/1932 | Quinn ............................... 198/774 X |
| 3,552,815 | 1/1971 | Keller .................................. 384/281 |
| 3,776,351 | 12/1973 | Erb ...................................... 198/776 |
| 4,017,127 | 4/1977 | Smith et al. ..................... 384/295 X |
| 4,116,619 | 9/1978 | Beck ............................... 198/774 X |
| 4,426,162 | 1/1984 | Tsuchiya et al. ............... 384/295 X |
| 4,538,855 | 9/1985 | Peetz et al. ........................ 74/570 X |

Primary Examiner—Alan Cohan
Assistant Examiner—John A. Rivell
Attorney, Agent, or Firm—Glenn B. Morse

[57] ABSTRACT

This bearing system has been developed primarily for long rotating shafts having a number of support points and supported objects. A beam is preferably extruded with a T-slot in one face. The slot receives the heads of mounting bolts securing a split bearing housing to the beam. A split eccentric assembly is also provided, which is rotatively secured to the shaft by clamps to generate orbital movement of a second beam, which is secured to a split bearing housing surrounding the eccentric assembly.

13 Claims, 6 Drawing Figures

LATERALLY-DISENGAGEABLE BEARING SYSTEM

BACKGROUND OF THE INVENTION

Many fields of machine design provide applications for rotating shafts extending through a series of bearing blocks mounted either on fixed supports, or secured to various objects carried by the shaft. Bearing maintenance on these installations is usually a problem. Unless all of the bearing components are laterally separable, the removal and replacement of one that happened to be in the middle of the series obviously requires the dismounting of the shaft, at least to the position of the bearing unit that seems to be causing the trouble. Split bearing housings and bearing inserts have been used to reduce this problem, but installation and alignment remain time-consuming operations. One application of this problem that has proved to be particularly troublesome is the so-called "walking beam" conveyor. A series of parallel fixed beams is mounted on some convenient ground support, and a transverse line shaft usually is received in bearings mounted on these beams. Interposed between the fixed beams is a second set of beams supported by bearings also engaged by the line shaft. The shaft carries eccentric assemblies received in bearing housings mounted on these latter beams, so that rotation of the shaft generates an orbital movement of the beams bringing them to a level above the plane of the fixed beams, and then below it. Objects placed on a conveyor of this type are subject to cyclical movements in which they are briefly lifted above the plane of the fixed support and moved slightly over the top sector of the orbital movement, and then again deposited on the fixed beams to await the next cycle. Maintenance of the obviously large number of bearings involved in a conveyor of substantial size has presented the problem responsible for the development of the present invention.

SUMMARY OF THE INVENTION

The fixed and moveable beams of a walking-beam conveyor system are preferably extruded in a similar cross-section, in which one flange of the beams is provided with a T-slot receiving the heads of bolts. These bolts secure the sections of a split bearing housing, the placement of which is easily adjustable along the extent of the T-slot, the adjustments being possible without more than slightly loosening these bolts. Bearing inserts are received between the housing sections, and are split for lateral separability. At the moving beams, the shaft traversing the fixed beam bearings is surrounded by an eccentric which is rotatably received in the split bearing housings mounted on the moving beams. The eccentric structure provides for the lateral separability of the components, and is rotatably secured to the shaft by clamping devices.

DESCRIPTION OF THE PREFERRED EMBODIMENT

Figure 1:
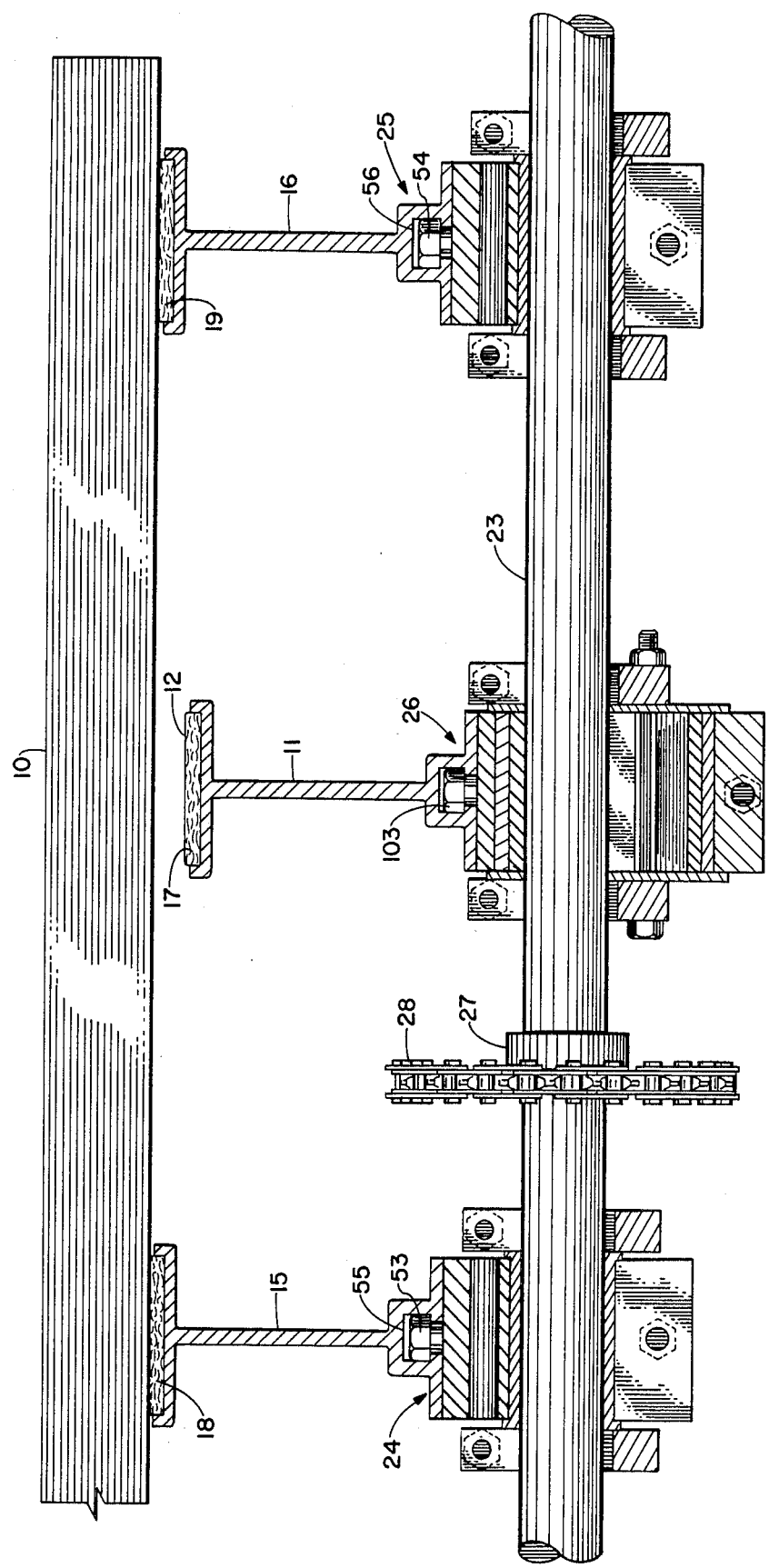
FIG. 1 is a section on a vertical plane across a walking-beam conveyor at the position of one of the line shafts, with the moving beam in the "down" position.
Figure 2:
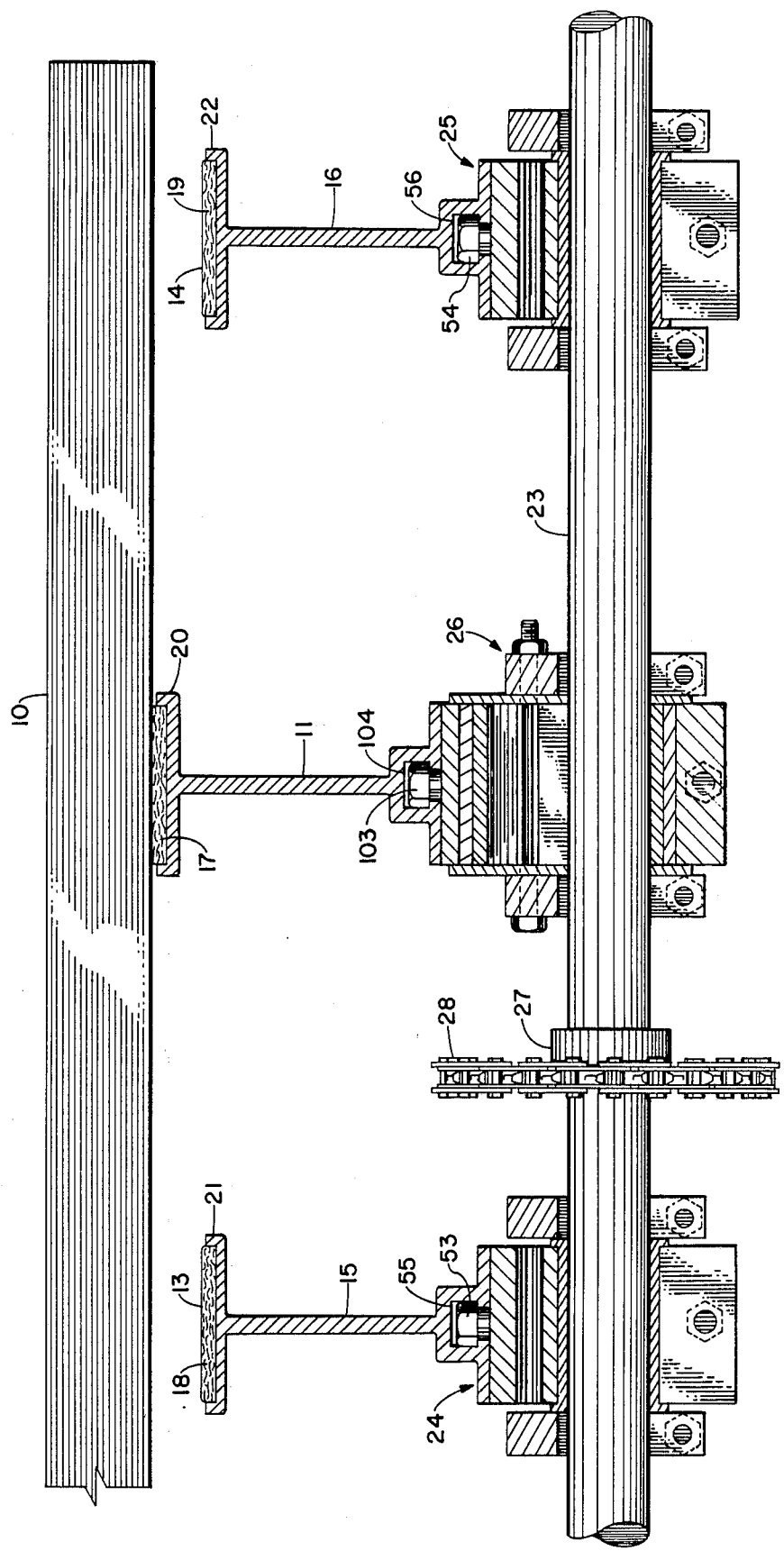
FIG. 2 is a view similar to FIG. 1, with the moving beam in the "up", or carrying position.

Referring to FIGS. 1 and 2, the illustrated conveyor installation provides cyclical incremental movement for conveyed objects as indicated at 10. In FIG. 1, the moving beam 11 is one of a series, and is illustrated in the "down" position providing clearance between the carrying surface 12 and the supported object 10. In the next phase of the operation, as shown in FIG. 2, the movement of the beam 11 places the carrying surface above the plane of the surfaces 13 and 14 of the fixed beams 15 and 16. Since the movement of the beam 11 is orbital, each lifting induces an increment of movement in the direction of the axes of the beams 11, 15, and 16. Preferably, the supporting surfaces 12, 13, and 14 are provided by replaceable insert strips indicated at 17–19. These are received in the channel-shaped configurations 20–22, respectively, on the beams. During this orbital movement, the shaft 23 is supported by the bearing assemblies generally indicated at 24 and 25 mounted respectively on the fixed beams 15 and 16, and the moving beam 11 is supported by the engagement of the eccentric and bearing installation generally indicated at 26, which transfers the weight carried by the beam 11 to the shaft 23. Rotation of the shaft is accomplished by the driving of the sprocket wheel 27 by the chain 28, which extends to a convenient source of rotative power (not shown). The fixed beams 15 and 16 can be placed on any convenient foundation or support structure (not shown).

Figure 3:
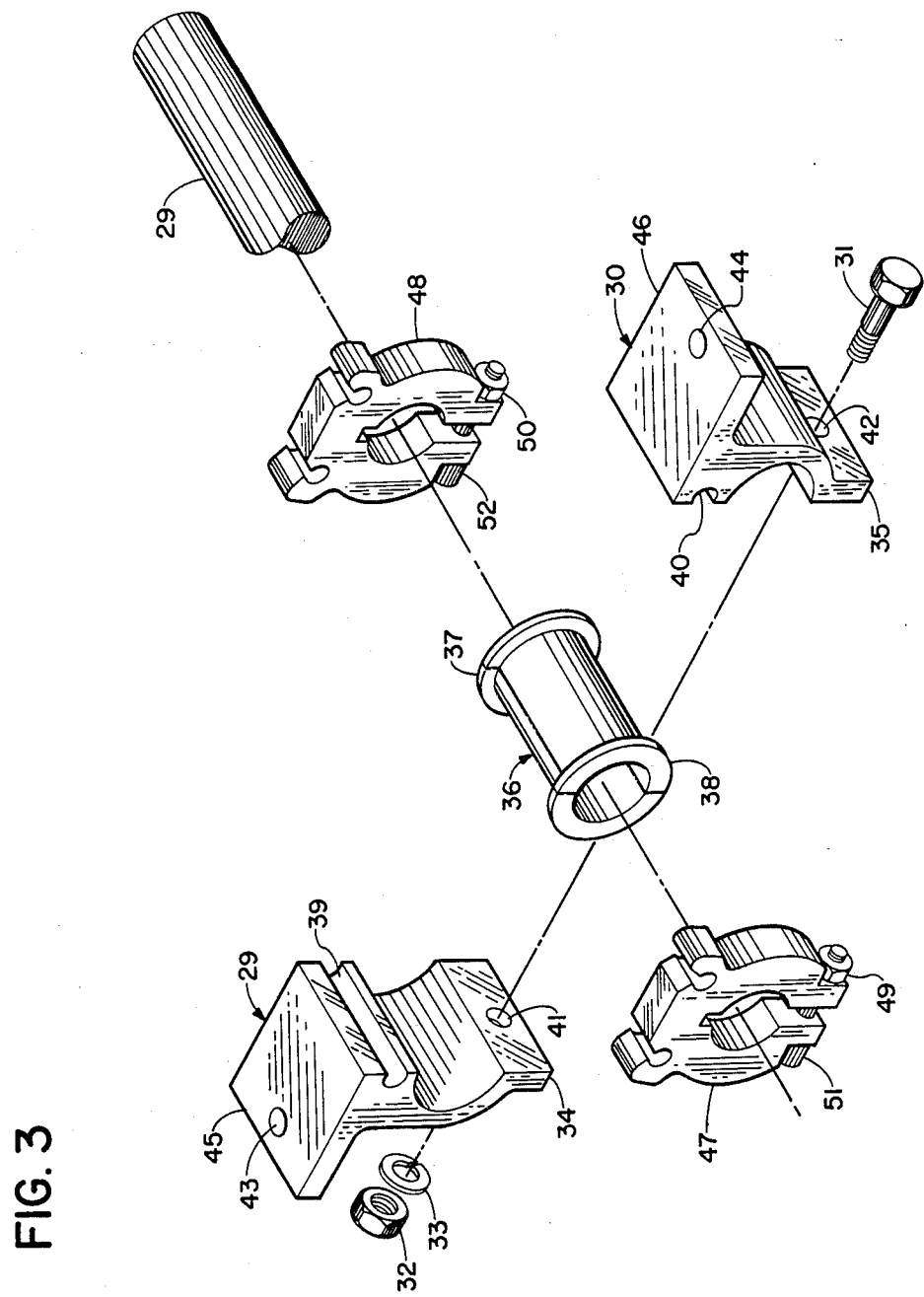
FIG. 3 is an exploded view of the bearing assembly associated with the fixed beams.

The details of the bearing assembly associating the shaft 23 with the fixed beams appear in FIG. 3. A split bearing housing is formed by the sections 29 and 30, which are interconnected by the bolt 31, and secured by the nut 32 and lockwasher 33. The bolt traverses the flanges 34 and 35 of the sections 29 and 30, respectively, the flanges meeting on a plane containing the axis of the bearing insert 36, which is preferably also split as shown on an axial plane. The insert has end flanges as shown at 37 and 38, which remain outside the end surfaces of the housing sections 29 and 30. The recesses 39 and 40 are non-functional, except for the removal of unnecessary metal. These sections may be cut from an extruded piece of aluminum. The holes 41 and 42 in the flanges 34 and 35, together with the holes 43 and 44 in the base flanges 45 and 46, are of course, drilled as a separate operation. The sections are brought together with the bearing insert between them, and the bolt 31 inserted and tightened to form a complete bearing assembly. As the shaft is being installed, the clamps 47 and 48 will have been slipped axially onto the shaft in the appropriate position of the bearing assembly, with enough separation between them to complete the assembly of the bearing components. These are obviously capable of assembly laterally. The clamps are then pulled up against the end flanges 37 and 38 of the bearing insert 36, and the nuts 49 and 50 tightened on the clamping bolts 51 and 52 to maintain the axial position of the shaft with respect to the bearing assembly. The bearing assembly itself is secured with respect to the fixed beam supporting it by bolts as shown at 53 and 54 in FIGS. 1 and 2. The heads of these bolts are received within the T-slots 55 and 56 in the beams 15 and 16. The openings of these slots retain the heads of the bolts, while permitting the bolts to be shifted axially along the beam to any desired position before they are tightened. The bolts traverse the holes 43 and 44 in the base flanges of the bearing housing sections 29 and 30, and are engaged by nuts (not shown) and washers bearing against the outside surfaces of these flanges.

Figure 4:
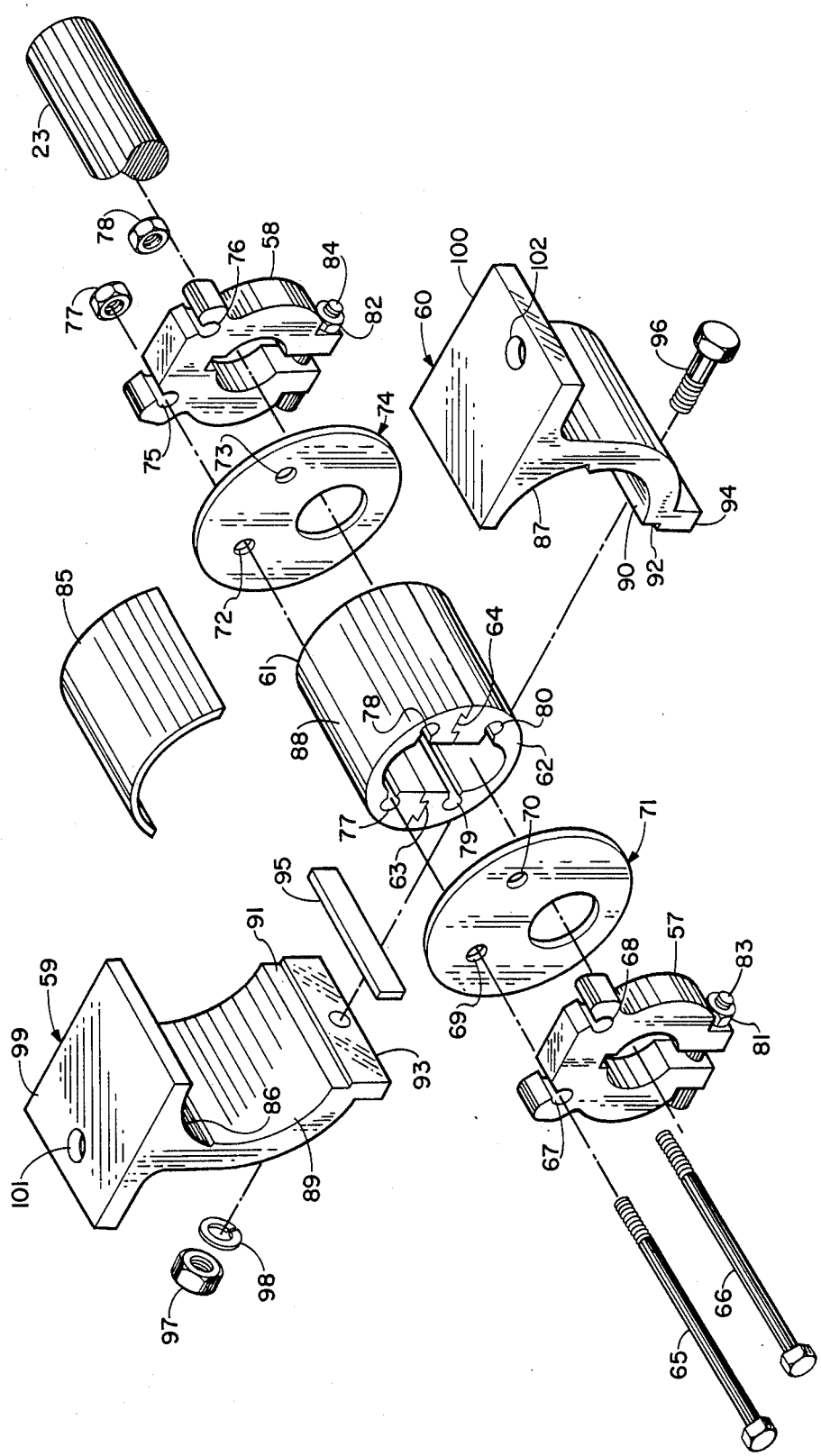
FIG. 4 is an exploded view showing the components of the eccentric assembly and the related bearing system associated with the moving beams.
Figure 5:
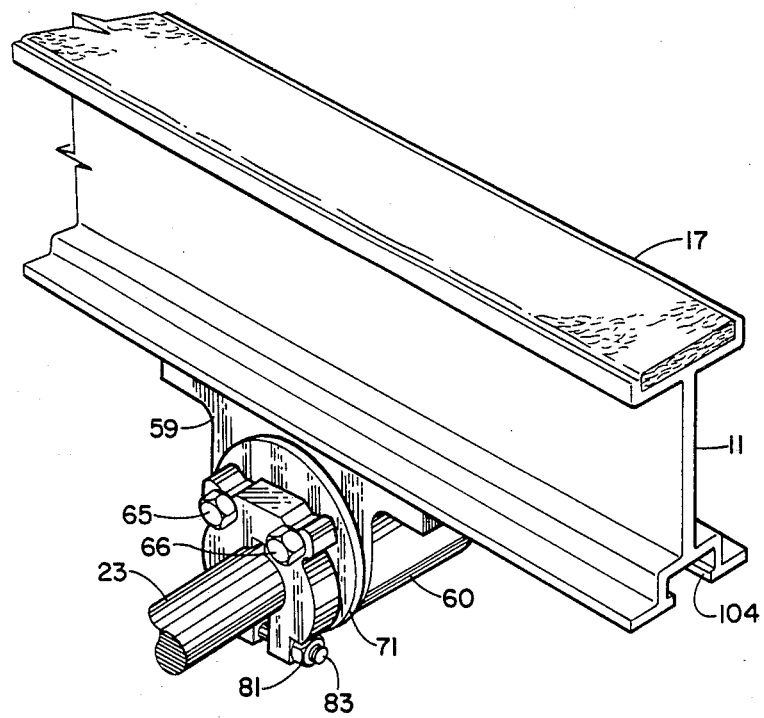
FIG. 5 is a perspective view showing the eccentric assembly installation.
Figure 6:
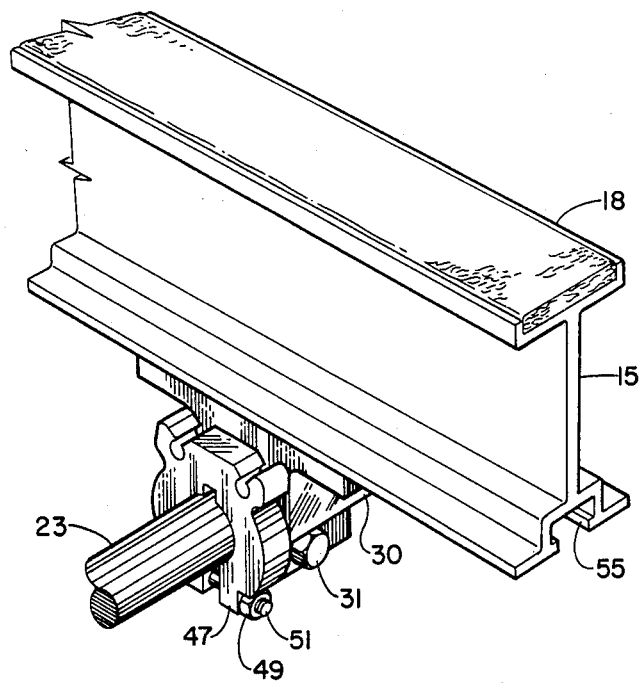
FIG. 6 is a perspective view showing the bearing assembly associated with the fixed beams.

For convenience, the clamps 47 and 48 are shown as having the same configuration as the shaft clamps 57 and 58 associated with the eccentric assembly illustrated in FIG. 4. Some of this configuration is not utilized in the bearing assembly appearing in FIG. 3. In FIG. 4, the bearing housing sections 59 and 60 are somewhat larger than the sections 29 and 30 shown in FIG. 3, in order to accommodate the larger diameter of the eccentric rotor formed by the similar sections 61 and 62. These are preferably of extruded aluminum of the same cross-section, and are switched end-for-end for the interengagement of the dovetails and dovetail recesses formed in the meeting surfaces of these sections as shown at 63 and 64. Each of the sections 61 and 62 will have a dovetail on one side, and a mating recess on the other, so that they are interengageable on the end-for-end reversal to hold the sections in close interengagement. Obviously, this interengagement can be accomplished laterally, with the shaft 23 in position, as long as the clamps 57 and 58 are temporarily separated far enough to provide the necessary space. Once this has been accomplished, the bolts 65 and 66 are installed so that they traverse the holes 67 and 68 in the clamp 57, the holes 69 and 70 in the bearing plate 71, the holes 72 and 73 in the opposite bearing plate 74, and the holes 75 and 76 in the clamp 58. The bolts are secured by nuts as shown at 77 and 78. Since the eccentric rotor sections 61 and 62 are extruded to a common cross-section, each will have axial holes as shown at 77–80 extending throughout their length. In the illustrated assembly, the bolts 65 and 66 will traverse the holes 77 and 78. When the clamping nuts 81 and 82 are tightened against the bolts 83 and 84, the clamps 57 and 58 will grip the shaft 23, and transfer torque through the bolts 65 and 66 to the eccentric rotor sections 61 and 62.

The bearing insert 85 is received within the recesses 86 and 87 of the housing sections 59 and 60, respectively, with the insert 85 extending over a sector of less than one hundred and eighty degrees with respect to the axis of the cylindrical surface 88 of the eccentric rotor assembly. This arrangement is practical because of the fact that the loading is transferred from the moveable beam 11 through the housings 59 and 60 in a downward direction against the surface of the eccentric rotor. The radial thickness of the bearing insert 85 is greater than the depth of the recess 86, resulting in a clearance space between the outside of the surface 88 of the eccentric rotor and the surfaces 89 and 90 of the housing sections 59 and 60. These sections have an offset as shown at 91 and 92 in the flanges 93 and 94 for receiving the spacer-wiper block 95, which is of a depth selected to engage the surface 88 of the eccentric rotor in the event of upward displacement of the beam 11 from its normal operating position with respect to the shaft 23. The bolt 96 traverses the flanges 93 and 94, and secures the housing sections 59 and 60 together when the nut 97 is tightened against the lockwasher 98. The presence of the space between the surfaces 89 and 90 and the eccentric rotor provides for a degree of cooling, and the wiper 95 has the effect also of removing particles of foreign material that might possibly adhere to the eccentric rotor, and entrapping them before they can damage the bearing insert 85. As with the fixed bearing assembly shown in FIG. 3, the housing sections 59 and 60 have a base flange as shown at 99 and 100 provided with holes 101 and 102 receiving a bolt as indicated at 103 in FIGS. 1 and 2. The beam 11 is extruded to the same cross-section as the beams 15 and 16, and the head of the bolt 103 is entrapped within the T-slot 104. The plates 71 and 74, being interposed between the ends of the eccentric rotor and the clamps 57 and 58, form thrust bearings, and are consequently preferably of the same material as that of the arcuate bearing insert 85. This material can be any one of a number of recently-developed plastic low-friction materials. One of these that has proven to be quite successful is known as GARDUR, manufactured by Garland Manufacturing Company. This same material can also be used for the bearing insert 36 shown in FIG. 3.

I claim:

1. A system for rotatably securing a shaft to a beam, including bearing means supporting said shaft and secured to said beam; wherein the improvement comprises:
   a configuration of said beam in which at least one face of said beam is provided with a T-slot;
   a housing confining said bearing means, said housing being separable into two sections, each section thereof having a base with at least one hole, said bearing means being separable to permit lateral engagement with a shaft appropriate to said bearing means:
   bolt means engageable with said T-slot including means retaining said bolt means therein, said bolt means also traversing said hole to secure said housing sections to said beam; and
   clamping means holding said housing sections together.

2. A system as defined in claim 1, wherein said configuration is a cross-section extending throughout the length of said beam.

3. A system as defined in claim 1, additionally including a shaft and an eccentric assembly rotatably receivable in said bearing means, said eccentric assembly including:
   a rotor having a cylindrical outer surface and separable into two sections, each of said sections having a central axially-aligned recess, and at least one axial hole and means securing said rotor sections together in axial alignment;
   at least one clamp adapted to engage and be rotatively fixed with respect to said shaft, and also
   bolt means traversing said axial hole in one of said rotor sections, and engaging said clamp to secure said eccentric assembly axially together, and to transfer torque.

4. A system as defined in claim 3, wherein a clamp is positioned adjacent both ends of said rotor, respectively, and said clamps each have a hole aligned with said rotor section hole, and traversed by said bolt means.

5. A system as defined in claim 3, wherein each of said rotor sections has a dovetail extension and a dovetail recess, said extensions and recesses being interengageable on placing one of said rotor sections in end-for-end reversed position with respect to the other of said rotor sections, said central recesses of both of said rotor sections being in lateral alignment with respect to each other, said dove-tail recesses and extensions constituting means for securing said rotor sections together.

6. A system as defined in claim 3, additionally including a bearing plate interposed between said clamp and said rotor, said plate having a hole, and also having a hole receiving said shaft in a position eccentric to said cylindrical surface, said shaft traversing said central recesses.

7. A system as defined in claim 3, wherein said housing has an internal recess receiving bearing insert means extending over a sector of less than one hundred-eighty degrees with respect to the axis of said cylindrical surface, and constituting said bearing means, the remaining sector being free of bearing means.

8. A system as defined in claim 7, wherein a space exists between said rotor and the inner surface of said housing sections exclusive of the portion thereof occupied by said bearing insert.

9. A system as defined in claim 8, additionally including a bearing bar received between said housing sections, and adapted to engage said rotor on displacement thereof from said bearing insert.

10. An eccentric assembly, comprising:
a housing separable into sections, said housing defining a central opening provided with bearing means;
a rotor having a cylindrical outer surface received in said bearing means, said rotor being separable into two sections, each of said rotor sections having a central axially aligned recess forming a continuation of the recess of the other of said rotor sections, and also having an axial hole and means securing said rotor sections together in axial alignment;
a shaft traversing at least one of said central recesses;
at least one clamp adapted to engage and be rotatively fixed with respect to said shaft, and also having an axial hole; and
bolt means traversing said axial hole in one of said rotor sections, and engaging said clamp and plate holes to secure said assembly axially together and to transfer torque.

11. A system defined in claim 10, wherein a clamp is positioned adjacent both ends of said rotor, respectively, and said clamps each have a hole aligned with said rotor section hole, and traversed by said bolt means.

12. A system defined in claim 10, wherein each of said rotor sections has a dovetail extension and a dovetail recess, said extensions and recesses being interengageable on placing one of said rotor sections in end-for-end reversed position with respect to the other of said rotor sections, said central recesses of both of said rotor sections being in lateral alignment with respect to each other, said dovetail recesses and extensions constituting means for securing said rotor sections together.

13. A system as defined in claim 10, additionally including a bearing plate interposed between said clamp and said rotor, said plate having a hole, and also having a hole receiving said shaft in a position eccentric to said cylindrical surface, said shaft traversing said central recesses.

* * * * *